Feb. 10, 1970     D. B. NEUMANN     3,494,698
FEEDBACK CONTROL DEVICE FOR STABILIZATION OF
INTERFERENCE FRINGES
Filed Feb. 21, 1967
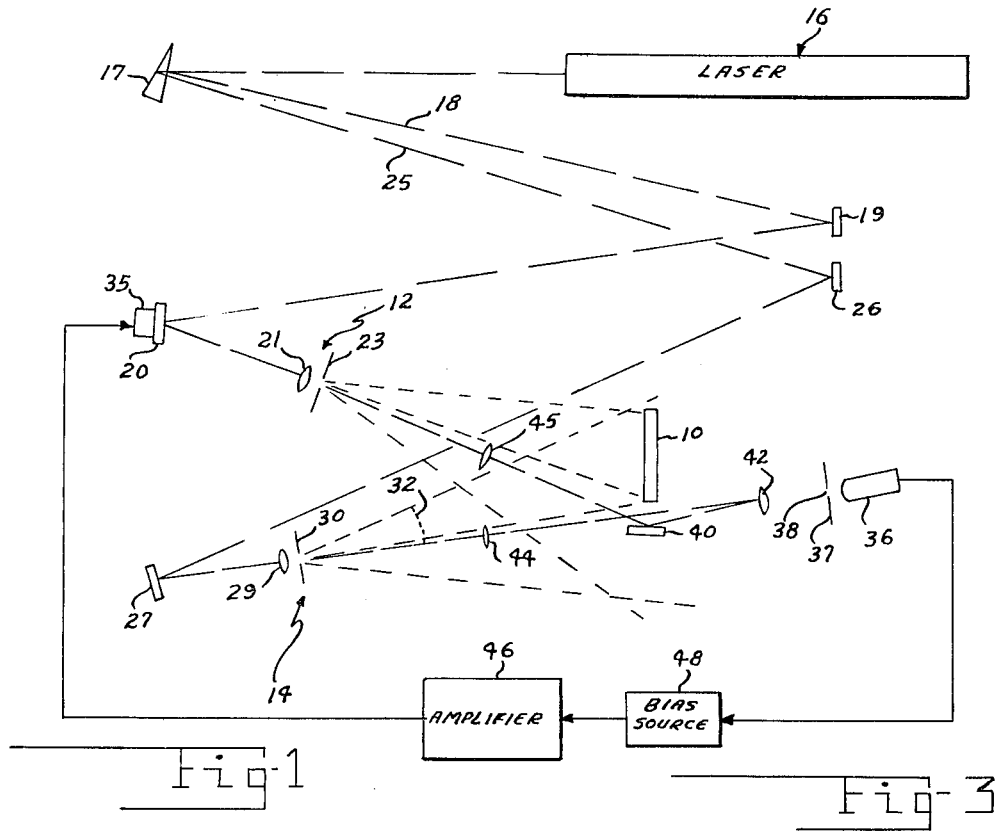
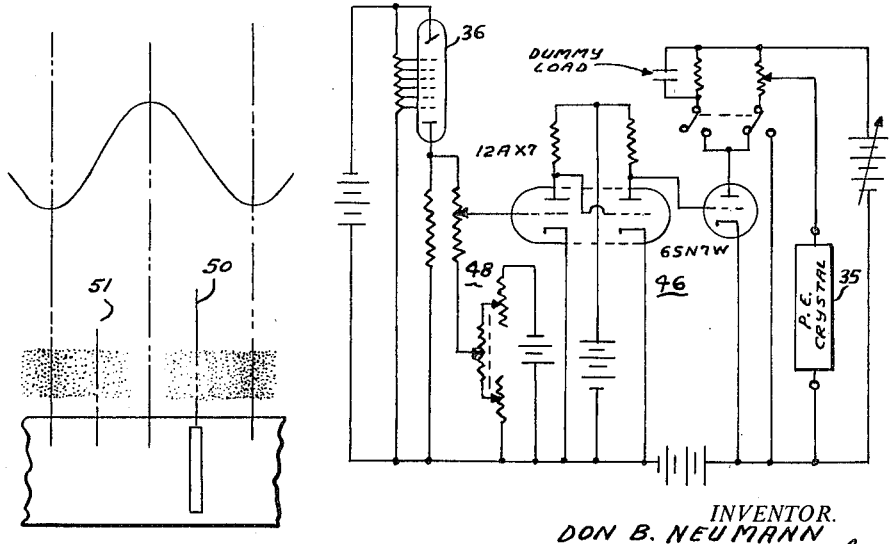
INVENTOR.
DON B. NEUMANN
BY Harry A. Herbert Jr
ATTORNEY
Richard J. Killoren
AGENT

United States Patent Office 3,494,698
Patented Feb. 10, 1970

3,494,698
FEEDBACK CONTROL DEVICE FOR STABILIZATION OF INTERFERENCE FRINGES
Don B. Neumann, Dayton, Ohio, assignor to the United States of America as represented by the Secretary of the Air Force
Filed Feb. 21, 1967, Ser. No. 618,302
Int. Cl. G01b 9/02; G02b
U.S. Cl. 356—106                     6 Claims

ABSTRACT OF THE DISCLOSURE

In a device that produces interference fringes by means of a signal beam of light and a reference beam of light, such as in the production of holograms, a photomultiplier has a mask with a narrow slit positioned adjacent thereto. A portion of the reference beam and a portion of the signal are made to illuminate the mask to produce interference fringes on the mask. A piezoelectric crystal driver is connected to a mirror in the reference beam path. The output of the photomultiplier is amplified and applied to the piezoelectric crystal driver to move the mirror and to alter the phase of the reference beam with respect to the signal beam to counter any change in the position of the fringe pattern on the slit.

---

The invention described herein may be manufactured and used by or for the United States Government for governmental purposes without the payment to me of any royalty thereon.

BACKGROUND OF THE INVENTION

Normally, in the production of holograms, the position of optical interference fringes is stabilized by providing very high mechanical rigidity between the various elements affecting the phase of the interfering light beams. However, in airborne systems there is great difficulty in achieving a lightweight, mechanically and acoustically stable system.

SUMMARY OF THE INVENTION

According to this invention, a portion of the fringe pattern to be stabilized is detected by means of a narrow slit and a photodetector. The output of the photodetector is amplified and applied to a phase-shifting element in one of the beam paths to provide a counter fringe motion which compensates for any undesired fringe motion.

One object of the invention is to reduce the high mechanical and thermal stability requirements in equipment such as holography equipment to provide motionless fringe patterns.

Another object of the invention is to provide a system for removing fringe drifts in equipment such as holography equipment caused by variations in the index of refraction of the air within the system.

These and other objects will be more fully understood from the following detailed description taken with the drawing.

BRIEF DESCRIPTION OF THE DRAWING

FIG. 1 is a schematic diagram of a holography system having a feedback stabilization system according to the invention;
FIG. 2 is a schematic illustration showing the position of the slit with respect to the fringes; and
FIG. 3 is a circuit schematic of the feedback stabilization system of the device of FIG. 1.

DESCRIPTION OF THE PREFERRED EMBODIMENTS

Reference is now made to FIG. 1 of the drawing which shows a conventional system for producing holograms wherein a hologram plate 10 is illuminated by a reference beam from reference beam source 12 and a signal beam from signal beam source 14, in the usual manner. A laser light source 16 directs a beam toward a wedged splitter 17. One of the beams 18 leaving the beam splitter 17 is directed toward mirror 19, then to mirror 20, which then passes through lens 21 and a pinhole aperture in mask 23 to provide the reference beam for illuminating the hologram 10. A second beam 25 leaving the beam splitter 17 is directed toward a mirror 26, then to mirror 27, after which it passes through lens 29 and a pinhole aperture in mask 30 to provide the signal beam for illuminating the hologram 10. A signal transparency 32 is positioned in the signal beam in the usual manner. The structure thus far described is conventional structure for producing holograms.

According to this invention, the mirror 20 is mounted on a piezoelectric crystal driver 35. A photomultiplier tube 36 having a mask 37 with a slit 38 is positioned in a portion of the signal beam path. A portion of the reference beam is directed toward slit 38 by means of a mirror 40. The mirror 40 is used to change the angle between the signal beam and the reference beam to about 5 degrees to decrease the spatial frequency of the interference fringes. A forty-five power microscope objective or short focal length lens 42 magnifies the fringe pattern to a width of about 3 mm., or about 10 slit widths, between maximums on the plane of the slit 38. Since the lens 42 has a very small aperture, collecting lenses 44 and 45 are provided to collect a larger quantity of the signal beam and the reference beam and to concentrate them on the lens 42. A high gain D.C. amplifier 46 is provided between the output of the photomultiplier 36 and the piezoelectric crystal driver 35. Since the intensity variations of the fringe pattern are impressed on a constant or average light level, the voltage variations across the photomultiplier load resistor, not shown, are also impressed on an average or D.C. value. An adjustable bias voltage from bias source 48 is therefore added to the photomultplier output signal to reduce the D.C. level and thus reduce the dynamic range required for the amplifier. The output of the amplifier 46 is applied to piezoelectric driver 35. The piezoelectric driver used was a ten element stack of crystals giving a net piezoelectric constant for the transducer of $3 \times 10^{-5}$ cm. per volt.

In the operation of the device, a hologram or other fringe pattern detector is illuminated by a signal beam from source 14 and a reference beam from source 12 in a conventional manner. A portion of the signal beam and reference beam are directed toward the slit 38 by means of lenses 44, 45, 42 and mirror 40. The output of the photomultiplier is amplified and applied to the piezoelectric driver 35. The circuit constants are selected to maintain the light-to-dark transition indicated at 50 aligned with the slit 38. Movement of the fringes in either direciton will cause a movement of the mirror 20 to return the fringe to the proper position. The device can be made to align the slit 38 with a particular position on either the light-to-dark transition 50 or the dark-to-light transition 51 shown in FIG. 2 by merely changing the polarity of the output signal of amplifier 46.

There is thus provided a system which reduces the high mechanical, thermal and acoustic stability requirements in holography equipment or other such equipment and which removes fringe drift caused by variations in the index of refraction of the air within the system.

I claim:

1. In combination with a light beam interference type device having a fringe pattern detector, a source of coherent light; means, including at least one mirror, for directing a first portion of the coherent light, from said source, toward said fringe pattern detector along a first predetermined path; means for directing a second portion of the coherent light, from said source, toward said fringe pattern detector along a second predetermined path, whereby interference fringes are produced at said fringe pattern detector; the improvement comprising means attached to said mirror for changing the length of said first predetermined path; means, including a photodetector for sensing movement of said interference fringes and means for applying the output of said photodetector to said path length changing means to alter the phase of the light along said first predetermined path with respect to the phase of the light along said second predetermined path to counter any change in the position of said interference fringes at said fringe pattern detector.

2. The device as recited in claim 1 wherein said path length changing means is a piezoelectric transducer attached to said mirror.

3. The device as recited in claim 2 including a first lens means for collecting light from said first predetermined path and for directing it toward said photodetector and a second lens means for collecting light from said second predetermined path and for directing it toward said photodetector.

4. The device as recited in claim 3 wherein said photodetector is a photomultiplier and a mask having a narrow slit therein in said light paths adjacent said photomultiplier.

5. The device as recited in claim 1 wherein said fringe pattern detector is a hologram; and said path length changing means is a piezoelectric transducer attached to said mirror; and wherein said device includes a first lens means for collecting light from said first predetermined path for directing it toward said photodetector and a second lens means for collecting light from said second predetermined path and for directing it toward said photodetector.

6. The device as recited in claim 5 wherein said photodetector is a photomultiplier and a mask having a narrow slit therein in the light paths adjacent said photomultiplier, means in one of said light paths for directing the light from said one light path toward said photomultiplier at an angle of about 5° with respect to the light from the other light path.

References Cited

UNITED STATES PATENTS 3,170,122   2/1965   Bennett _____ 331—94.5
3,202,052   8/1965   Rambauske et al. _____ 356—106

OTHER REFERENCES

"Generation of a Hologram from a Moving Target," Corcoran et al., Applied Optics, vol. 5, No. 4.

RONALD L. WIBERT, Primary Examiner

CONRAD CLARK, Assistant Examiner

U.S. Cl. X.R.

350—3.5